United States Patent
Kapadia et al.

(10) Patent No.: US 9,201,655 B2
(45) Date of Patent: Dec. 1, 2015

(54) METHOD, COMPUTER PROGRAM PRODUCT, AND HARDWARE PRODUCT FOR ELIMINATING OR REDUCING OPERAND LINE CROSSING PENALTY

(75) Inventors: Vimal M. Kapadia, New York, NY (US); Fadi Y. Busaba, Poughkeepsie, NY (US); Edward T. Malley, New Rochelle, NY (US); John G. Rell, Jr., Saugerties, NY (US); Chung-Lung Kevin Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1729 days.

(21) Appl. No.: 12/051,296

(22) Filed: Mar. 19, 2008

(65) Prior Publication Data
US 2009/0240918 A1    Sep. 24, 2009

(51) Int. Cl.
 G06F 13/00   (2006.01)
 G06F 13/28   (2006.01)
 G06F 9/38    (2006.01)

(52) U.S. Cl.
 CPC ................................. G06F 9/3824 (2013.01)

(58) Field of Classification Search
 None
 See application file for complete search history.

(56) References Cited

U.S. PATENT DOCUMENTS

| | | | |
|---|---|---|---|
| 6,754,780 B1 * | 6/2004 | Carlson et al. | 711/137 |
| 2002/0116598 A1 | 8/2002 | Leijten | |
| 2005/0286633 A1 | 12/2005 | Abel et al. | |
| 2005/0289321 A1 * | 12/2005 | Hakewill et al. | 712/1 |
| 2007/0038848 A1 | 2/2007 | Gschwind et al. | |
| 2009/0044273 A1 * | 2/2009 | Zhou et al. | 726/24 |

OTHER PUBLICATIONS z/Architecture Principles of Operation, International Business Machines Corporation, SA22-7832-05, Sixth Edition (Apr. 2007).

* cited by examiner

*Primary Examiner* — Eric S Cardwell
(74) *Attorney, Agent, or Firm* — Cantor Colburn LLP; Margaret McNamara

(57) ABSTRACT

Eliminating or reducing an operand line crossing penalty by performing an initial fetch for an operand from a data cache of a processor. The initial fetch is performed by allowing or permitting the initial fetch to occur unaligned with reference to a quadword boundary. A plurality of subsequent fetches for a corresponding plurality of operands from the data cache are performed wherein each of the plurality of subsequent fetches is aligned to any of a plurality of quadword boundaries to prevent each of a plurality of individual fetch requests from spanning a plurality of lines in the data cache. A steady stream of data is maintained by placing an operand buffer at an output of the data cache to store and merge data from the initial fetch and the plurality of subsequent fetches, and to return the stored and merged data to the processor.

20 Claims, 3 Drawing Sheets

METHOD, COMPUTER PROGRAM PRODUCT, AND HARDWARE PRODUCT FOR ELIMINATING OR REDUCING OPERAND LINE CROSSING PENALTY

BACKGROUND OF THE INVENTION

This invention relates to computer systems and in particular to processors that utilize a data level cache for holding operands.

Modern microprocessors may incorporate a private local level 1 data cache (L1) that holds recently accessed operand data in order to provide improved performance. This L1 cache holds recently accessed data, or data that are prefetched for potential future operand fetch requests for the processor, or both. Caches are known to be managed in terms of cache lines, which are usually of a pre-defined fixed size of data. Lines are known to range from 32 bytes to 256 bytes, but lines are not limited to those sizes. In an architecture that allows unaligned (i.e. not aligned to storage boundaries) operand access, a requested operand or operands can span multiple cache lines.

Assume the cache under discussion can return one doubleword (DW) which is 8 bytes of data per fetch request. When the length of an operand is more than 1 byte, the fetch request can cross from one cache line to the next, i.e. part of the data requested is in a first cache line, while another part of data requested is in a second, subsequent cache line. When line crossing is involved, a Load-Store Unit (LSU) which processes the fetch request will usually have to perform two subsequent lookups to figure out whether the LSU has the lines in its cache and, if so, figure out a location in the cache where the lines reside.

For a simple instruction, like an 8-byte load instruction, a typical processor pipeline will assume it takes one cycle to finish the lookup. When a line crossing occurs, the processor pipeline will keep the first piece of data obtained from the first line, and then it will have to "hold" execution by either directly stalling execution for some cycles, or provide a pipeline reject for some cycles, so that the processor pipeline can schedule a fetch to the next line to obtain the 2nd piece of data.

For instructions that require more than 8 bytes, e.g. Load Multiple (LM) in IBM's z-architecture, it is possible or probable that the requested operands will cross a cache line (or multiple cache lines). For a processor design, when the length of an operand is greater than the cache data return bus, multiple operand fetch requests must be performed for each block of data. As the requestor fetches sequentially from one block to the next, a penalty will be incurred when that particular operand fetch request requires data to be returned from two separate lines in a given cycle. This penalty will be similar to the penalty when a simple instruction's operand crosses a line as described earlier.

In a processor that implements an instruction set architecture that has many long operand instructions (for example, IBM's z-Architecture), and when a pipeline hiccup during a line crossing can be many cycles, it is important to have a solution that both avoids unnecessary line crossing penalties and is a low-latency solution that does not impact the performance of operand fetches that do not cross a line. Some processor designs merely tolerate the line reject penalty in the middle of a long operand instruction. Other designs try to solve this problem by always putting a "gap" (or stall) cycle after the initial address generation to figure out whether there is a line crossing and readjust its fetching pattern. Other possible solutions can be implemented by providing multi-port L1 directory and cache accesses to concurrently access line X, and line X+1, but this would impact both area and frequency as the required array design is relatively large and thus slower. Accordingly, an improved low-latency solution for avoiding unnecessary line crossing penalties is needed.

BRIEF SUMMARY OF THE INVENTION

A processor implemented method for eliminating or reducing an operand line crossing penalty performs an initial fetch for an operand from a data cache of a processor by allowing or permitting the initial fetch to occur unaligned with reference to a quadword boundary. A plurality of subsequent fetches for a corresponding plurality of operands from the data cache are performed wherein each of the plurality of subsequent fetches is aligned to any of a plurality of quadword boundaries to prevent each of a plurality of individual fetch requests from spanning a plurality of lines in the data cache. A steady stream of data is maintained by placing an operand buffer at an output of the data cache to store and merge data from the initial fetch and the plurality of subsequent fetches, and to return the stored and merged data to the processor.

A computer program product and a hardware product corresponding to the foregoing method are also disclosed herein.

BRIEF DESCRIPTION OF THE DRAWINGS

Referring now to the drawings wherein like elements are numbered alike in the several FIGURES.

The detailed description explains the preferred embodiments of the invention, together with advantages and features, by way of example with reference to the drawings.

DETAILED DESCRIPTION

An illustrative operand fetching method eliminates or reduces an operand line crossing penalty. The fetching method does not always incur a gap cycle, and eliminates any line crossing penalty as long as it is not encountered on the first fetch. If an operand line crossing is detected on the first fetch, incurring a line crossing penalty is unavoidable. But, for most processor workloads, an operand line crossing on the first fetch is a rare event. For example, most operand line crossing occurs when more than one operand is already fetched in a long operand instruction. To avoid much of the line crossing penalty, one should allow only the initial fetch for an operand to occur unaligned. All subsequent fetches that are made for a long operand are then aligned to a quadword boundary to prevent these individual fetch requests from spanning multiple lines. To maintain a steady stream of data, an operand buffer is placed at the output of the data cache to store and merge data from prior fetches to return to the processor.

Figure 1:
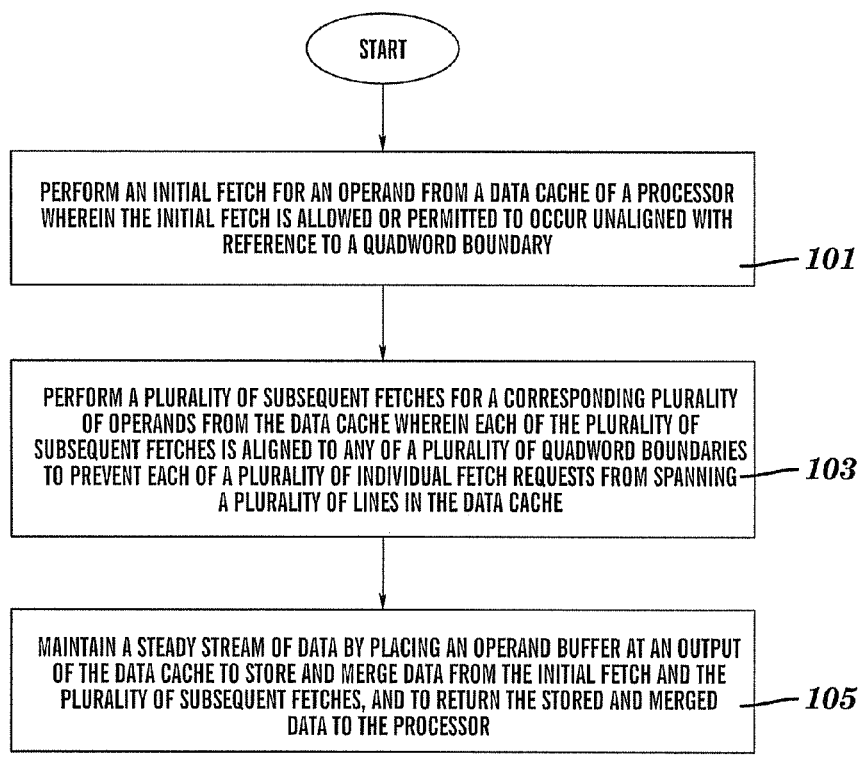
FIG. 1 is a flowchart setting forth an illustrative operand fetching method for eliminating or reducing an operand line crossing penalty.

FIG. 1 is a flowchart setting forth an illustrative operand fetching method for eliminating or reducing an operand line crossing penalty. The processor implemented method commences at block 101 where an initial fetch is performed for an operand from a data cache of a processor. The initial fetch is allowed or permitted to occur unaligned with respect to a quadword boundary. Next, at block 103, a plurality of subsequent fetches are performed for a corresponding plurality of operands from the data cache wherein each of the plurality of subsequent fetches is aligned to any of a plurality of quadword boundaries to prevent each of a plurality of individual fetch requests from spanning a plurality of lines in the data cache. The method progresses to block 105 where a steady stream of data is maintained by placing an operand buffer at an output of the data cache to store and merge data from the initial fetch and the plurality of subsequent fetches, and to return the stored and merged data to the processor.

The flow diagram of FIG. 1 is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The method of FIG. 1 may be employed in the context of a data cache that returns 16 bytes (a QW) of data. The data is DW storage aligned per fetch request within the same cache line per cycle per request pipe. Assume that an execution unit in the processor consumes, for example, 8 bytes of data per cycle per execution pipe. Therefore, there will be more data fetched than possibly consumed per cycle. The excess data fetched due to the bandwidth difference is used to help eliminate the line crossing penalty together with the aforementioned operand fetching method. The cache data return design is not an integral part of the method disclosed herein, but rather may be considered part of a typical cache design that is well known to those of ordinary skill in the relevant art.

Block 101 (FIG. 1) may, but need not, include making an initial fetch request to the data cache during an address generation cycle of a processor pipeline. The data cache returns 16 bytes (quadword) of data to the operand buffer from a single cache line for each fetch request, and the operand buffer returns 0 to 8 bytes of this data to the processor each cycle. If the number of bytes required from the first data return spans into the following line, the processor will take a linecrossing penalty. In a processor pipeline that this is implemented with an instruction reject and restart mechanism, this could range from 6 to 11 cycles.

The number of bytes required from a data return is a function of the alignment of the data (left or right) and the operand length as defined by the architecture being supported. For left-aligned operands that are 8 bytes or greater in length, the 18-bytes of data must be returned in the first (1) cycle. For right-aligned operands, the number of bytes returned in the 1 cycle is $\{[(X-1) \bmod 8]+1\}$, where X is the full length of the operand. If any of those bytes are in the subsequent line relative to the 1 byte of data, then a line-crossing penalty will be incurred. Otherwise, the operand fetching method eliminates any line crossing penalty.

Figure 2:
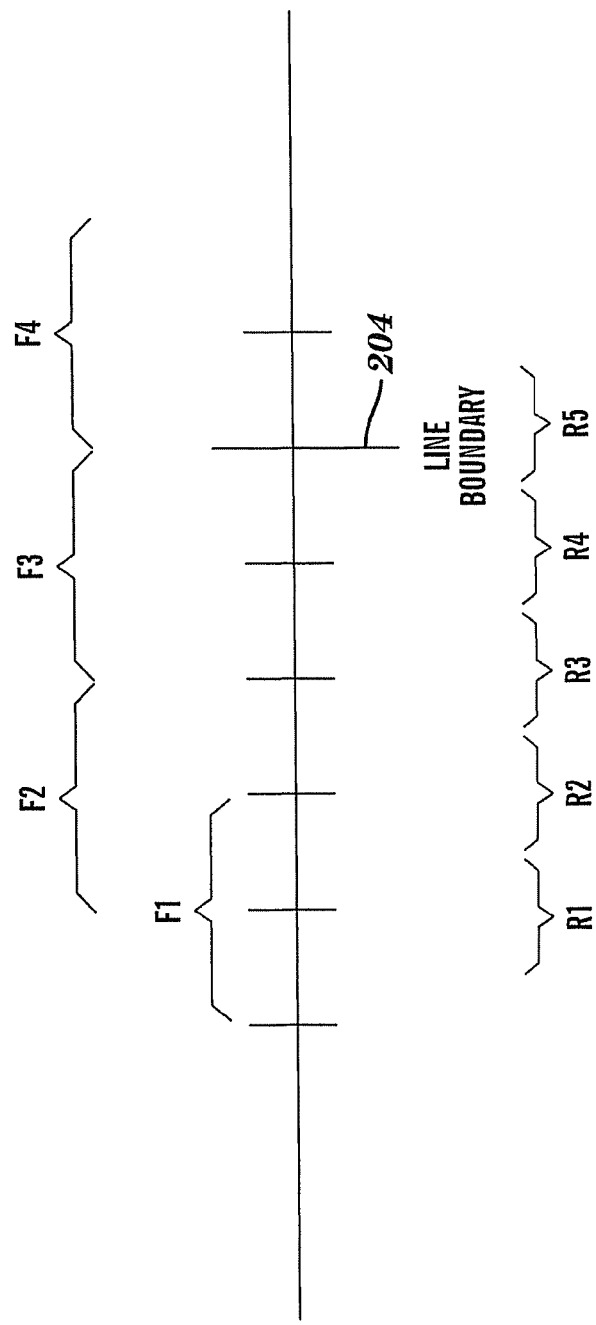
FIG. 2 is a diagram setting forth an illustrative data structure for use with the method of FIG. 1.

FIG. 2 is a diagram setting forth an illustrative data structure for use with the method of FIG. 1. As an example, F1-F4 represent fetch requests 1 through 4 in a long operand instruction from the operand fetching state machine towards a data cache (D-cache) in a Load-Store Unit (LSU). R1-R5 represent data returns 1 through 5 for each request from the LSU. As seen in this example, fetch request F1, representing an initial fetch, starts unaligned because it is based upon an initial address generation. All subsequent fetches (F2 to F4) align themselves such that these fetches cannot cross a line boundary 204. Since 16 bytes of data is fetched, and only 8 bytes are returned to execution at data return R1, the "excess" data from each fetch is then buffered, so that the data required for R2 uses data from F1 and F2, R2 uses purely F2 data, R3 uses from F2 and F3, R4 uses purely from F4, and R5 uses data from F3 and F4.

Figure 3:
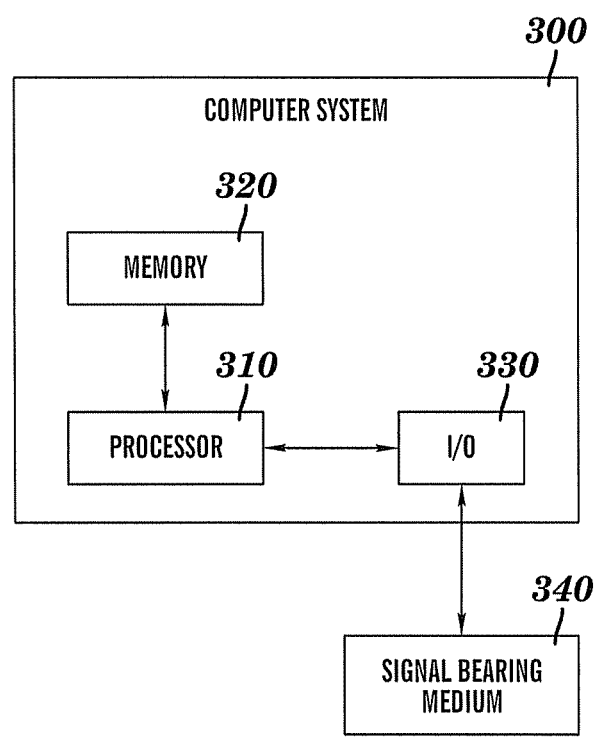
FIG. 3 is a block diagram setting forth an illustrative computer program product or hardware product for eliminating or reducing an operand line crossing penalty.

FIG. 3 shows a computer program product or hardware product for eliminating or reducing an operand line crossing penalty. The system includes a computer 300 operatively coupled to a signal bearing medium 340 via an input/output interface (I/O) 330. The signal bearing medium 340 may include a representation of instructions for providing result forwarding between differently sized operands in a superscalar processor, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for eliminating or reducing an operand line crossing penalty, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a program for eliminating or reducing an operand line crossing penalty. The processor 310 implements instructions for allowing an initial fetch for an operand to occur unaligned. A plurality of subsequent fetches for a long operand are aligned to a quadword boundary to prevent each of a plurality of individual fetch requests from spanning a plurality of lines. A steady stream of data is maintained by placing an operand buffer at an output of a data cache to store and merge data from prior fetches, and to return the stored and merged data to the processor. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A processor implemented method for eliminating or reducing an operand line crossing penalty, the method comprising:
    performing an initial fetch for an operand from a data cache of a processor by permitting the initial fetch to complete unaligned with reference to a quadword boundary;
    storing all data from the initial fetch in an operand buffer as an output of the data cache;
    performing a plurality of subsequent fetches for a corresponding plurality of operands from the data cache wherein each of the plurality of subsequent fetches is aligned to any of a plurality of quadword boundaries to prevent each of a plurality of individual fetch requests from spanning a plurality of lines of the data cache, and each fetch fetches a number of bytes of data greater than a number of bytes of data returned to the processor in a single cycle; and
    merging and storing all of the data from the plurality of subsequent fetches with the data from the initial fetch in the operand buffer as an output of the data cache; and
    returning the stored and merged data in segments to the processor.

2. The method of claim 1 further including the data cache returning a quadword of data that is doubleword storage aligned for each of the plurality of subsequent fetches.

3. The method of claim 2 wherein the quadword of data is doubleword storage aligned within a line of the data cache in each of a plurality of cycles.

4. The method of claim 3 wherein the quadword of data is doubleword storage aligned for each of a plurality of request pipes.

5. The method of claim 3 further including providing the processor with an execution unit that consumes eight bytes of data for each of the plurality of cycles, such that more data is fetched than consumed for each of the plurality of cycles.

6. The method of claim 1 wherein the initial fetch is performed during an address generation cycle of a processor pipeline.

7. The method of claim 6 wherein the data cache returns a quadword of data to the operand buffer from a single line of the data cache for each of the plurality of subsequent fetches, and the operand buffer returns zero to eight bytes of the quadword of data to the processor during each of a plurality of processor cycles.

8. A computer program product comprising a storage medium readable by a processing circuit and storing instructions for execution by the processing circuit for facilitating a method for eliminating or reducing an operand line crossing penalty, the method including:
    performing an initial fetch for an operand from a data cache of a processor by permitting the initial fetch to complete unaligned with reference to a quadword boundary;
    storing all data from the initial fetch in an operand buffer as an output of the data cache;
    performing a plurality of subsequent fetches for a corresponding plurality of operands from the data cache wherein each of the plurality of subsequent fetches is aligned to any of a plurality of quadword boundaries to prevent each of a plurality of individual fetch requests from spanning a plurality of lines of the data cache, and each fetch fetches a number of bytes of data greater than a number of bytes of data returned to the processor in a single cycle; and
    merging and storing all of the data from the plurality of subsequent fetches with the data from the initial fetch in the operand buffer as an output of the data cache; and
    returning the stored and merged data in segments to the processor.

9. The computer program product of claim 8 further including the data cache returning a quadword of data that is doubleword storage aligned for each of the plurality of subsequent fetches.

10. The computer program product of claim 9 wherein the quadword of data is doubleword storage aligned within a line of the data cache in each of a plurality of cycles.

11. The computer program product of claim 10 wherein the quadword of data is doubleword storage aligned for each of a plurality of request pipes.

12. The computer program product of claim 10 further including providing the processor with an execution unit that consumes eight bytes of data for each of the plurality of cycles, such that more data is fetched than consumed for each of the plurality of cycles.

13. The computer program product of claim 8 wherein the initial fetch is performed during an address generation cycle of a processor pipeline.

14. The computer program product of claim 13 wherein the data cache returns a quadword of data to the operand buffer from a single line of the data cache for each of the plurality of subsequent fetches, and the operand buffer returns zero to eight bytes of the quadword of data to the processor during each of a plurality of processor cycles.

15. A hardware product for eliminating or reducing an operand line crossing penalty comprising:
    a data cache;
    an operand buffer coupled to said data cache; and
    a processor coupled to said data cache, the hardware product configured to perform a method comprising:

performing an initial fetch for an operand from the data cache of a processor by permitting the initial fetch to complete unaligned with reference to a quadword boundary;

storing all data from the initial fetch in the operand buffer as an output of the data cache;

performing a plurality of subsequent fetches for a corresponding plurality of operands from the data cache wherein each of the plurality of subsequent fetches is aligned to any of a plurality of quadword boundaries to prevent each of a plurality of individual fetch requests from spanning a plurality of lines of the data cache, and each fetch fetches a number of bytes of data greater than a number of bytes of data returned to the processor in a single cycle; and merging and storing all of the data from the plurality of subsequent fetches with the data from the initial fetch in the operand buffer; and returning the stored and merged data in segments to the processor.

16. The hardware product of claim 15 further including the data cache returning a quadword of data that is doubleword storage aligned for each of the plurality of subsequent fetches.

17. The hardware product of claim 16 wherein the quadword of data is doubleword storage aligned within a line of the data cache in each of a plurality of cycles.

18. The hardware product of claim 17 wherein the quadword of data is doubleword storage aligned for each of a plurality of request pipes.

19. The hardware product of claim 15 further including providing the processor with an execution unit that consumes eight bytes of data for each of the plurality of cycles, such that more data is fetched than consumed for each of the plurality of cycles.

20. The hardware product of claim 15 wherein the initial fetch is performed during an address generation cycle of a processor pipeline, and wherein the data cache returns a quadword of data to the operand buffer from a single line of the data cache for each of the plurality of subsequent fetches, and the operand buffer returns zero to eight bytes of the quadword of data to the processor during each of a plurality of processor cycles.

* * * * *